United States Patent
Marcinkiewicz

[11] Patent Number: 5,483,136
[45] Date of Patent: Jan. 9, 1996

[54] EMI FILTER AND METHOD

[75] Inventor: Joseph G. Marcinkiewicz, Bellefontaine Neighbors, Mo.

[73] Assignee: Emerson Electric Co., St. Louis, Mo.

[21] Appl. No.: 250,158

[22] Filed: May 27, 1994

[51] Int. Cl.⁶ .................................................. H03H 7/00
[52] U.S. Cl. ............................ 318/558; 363/47; 333/25; 333/181
[58] Field of Search ............................... 318/254, 558, 318/722, 801; 363/37, 44, 45, 47; 324/613; 336/155, 170, 180; 333/25, 32, 170, 181

[56] References Cited

U.S. PATENT DOCUMENTS

| | | | |
|---|---|---|---|
| 3,753,168 | 8/1973 | Schor . | |
| 4,086,519 | 4/1978 | Persson | 318/254 |
| 4,162,435 | 7/1979 | Wright | 318/138 |
| 4,169,990 | 10/1979 | Lerdman | 318/138 |
| 4,250,435 | 2/1981 | Alley et al. | 318/138 |
| 4,314,189 | 2/1982 | Okado et al. | 318/732 |
| 4,427,933 | 1/1984 | Wagener et al. | 318/711 |
| 4,491,772 | 1/1985 | Bitting | 318/254 |
| 4,499,408 | 2/1985 | Bitting et al. | 318/254 |
| 4,500,821 | 2/1985 | Bitting et al. | 318/254 |
| 4,540,921 | 9/1985 | Boyd, Jr. et al. | 318/254 |
| 4,556,827 | 12/1985 | Erdman | 318/254 |
| 4,565,957 | 1/1986 | Gary et al. | 318/723 |
| 4,642,536 | 2/1987 | Boyd, Jr., et al. | 318/254 |
| 4,642,537 | 2/1987 | Young | 318/254 |
| 4,654,566 | 3/1987 | Erdman | 318/254 |
| 4,763,347 | 8/1988 | Erdman | 318/254 |
| 4,835,839 | 6/1989 | Forbes et al. | 29/596 |
| 4,916,599 | 4/1990 | Traxler et al. . | |
| 4,950,918 | 8/1990 | O'Breartuin et al. | 307/242 |
| 4,978,896 | 12/1990 | Shah | 318/254 |
| 5,198,969 | 3/1993 | Redl et al. . | |
| 5,198,972 | 3/1993 | Lafuze | 363/138 |
| 5,200,672 | 4/1993 | Sheynberg et al. . | |
| 5,241,254 | 8/1993 | Offringa et al. | 318/800 |

*Primary Examiner*—Bentsu Ro
*Attorney, Agent, or Firm*—Polster, Lieder, Woodruff & Lucchesi

[57] ABSTRACT

An improved EMI filter design is provided for an inverter operated dynamoelectric machine. A lossy balun wound choke is connected between a power supply in the form of a bridge rectifier and the inverter. The choke acts as a source resistance. Using the choke as the source resistance, an equiripple approximation to linear phase filter is derived. The filter is placed on the input side of the bridge rectifier. A method of designing an EMI filter for use in conjunction with an inverter operated dynamoelectric machine.

15 Claims, 1 Drawing Sheet

P1=33 TO 48, P2=34 TO 48, P3=33 TO 34,
P4=63 TO 48, P5=64 TO 48, P6=63 TO 64.

EMI FILTER AND METHOD

BACKGROUND OF THE INVENTION

This invention relates to electromagnetic interference filter designs and, in particular, to an improved method and filter design employed with inverter controlled dynamoelectric machines. While the invention is described with particular emphasis with respect to its use with brushless permanent magnet motors, those skilled in the art will recognize the wider applicability of the inventive principles disclosed hereinafter.

Inverter controlled dynamoelectric machines of various types are well known in the art. Inverter controls can be employed with conventional induction motors, brushless permanent magnet motors, and switch reluctance motors, for example. These motors have in common a stator assembly including a core and stator windings carried by the core. A rotor is mounted for rotation with respect to the stator. Primarily, the motors differ in the design of their rotors. An induction motor, for example, employs a squirrel cage rotor, while the permanent magnet motor has permanent magnets associated with the rotor structure. A switch reluctance motor uses a preformed, solid core rotor design that does not include either the squirrel cage windings of the induction motor or the permanent magnets of the permanent magnet motor. The motor types also differ in that rotor position information is required for controlling operation of the brushless permanent magnet motors and switch reluctance motors. Such information is not required for a controlled induction motor.

It long has been recognized that brushless permanent magnet motors and switch reluctance motors offer higher operating efficiency in most applications as compared to their induction motor counterparts. The increase in operating efficiency, however, is weighed against the cost of the electronic control required to operate the motor properly for all operating conditions. As will be appreciated by those skilled in the art, induction motors are ubiquitous in application. If one is willing to bear the cost differential for motor controls, either the brushless permanent magnet motor or the switch reluctance motor can be substituted for the induction motor in any particular application requirement.

Although both brushless permanent magnet motors and switch reluctance motors have for many years been promoted in high efficiency applications, their widespread substitution for induction motors has lagged because of the cost associated with the motor controls. One problem associated with any inverter operated dynamoelectric machine is the generation of electromagnetic interference (EMI). For example, a domestic appliance, such as a washing machine or a furnace blower motor, can cause considerable interference on the power lines which consumers find objectionable. The United States government, in fact, has regulations controlling the electromagnetic interference which products must meet before they are sold commercially.

The common way to eliminate EMI problems is to utilize some form of filter in conjunction with the motor control.

In the past, filters designed for use in a motor control were and are expensive because they employ high cost precision components.

I am aware of low cost filter designs, for example, as described in the *Handbook of Filter Synthesis* by Anatoli Zverev, published by John Wylie and Sons, Inc., 1967. These designs, prior to my invention, were unsuitable for application to inverter controlled dynamoelectric machines. I have found that a highly efficient, relatively low cost filter for use in inverter controlled dynamoelectric machines can be designed when a very lossy balun choke is inserted between the power supply link and the inverter control used to control the dynamoelectric machine. The lossy choke provides a real impedance that can be used to determine other reactive components that provide good attenuation while maintaining an almost ideal impulse response. The addition of the lossy balun wound choke allows EMI filter design to be accomplished using standard linear lossless ladder networks. While the filter is highly effective, the components employed with the filter, including the lossy choke, are substantially reduced in cost as compared to previous EMI filter designs employed in inverter controlled dynamoelectric machines with which I am familiar.

One of the objects of this invention is to provide an efficient low cost EMI filter for an inverter controlled dynamoelectric machine.

Another object of this invention is to provide a method of designing an EMI filter for an inverter controlled dynamoelectric machine.

Still another object of this invention is to provide an EMI filter for a dynamoelectric machine which employs conventional components which provide good attenuation for EMI generated by the inverter/motor combination.

Another object of this invention is to provide a filter which maintains an almost ideal impulse response.

Other objects of this invention will be apparent to those skilled in the art in light of the following description and accompanying drawings.

SUMMARY OF THE INVENTION

In accordance with this invention, generally stated, a control device for an inverter operated dynamoelectric machine is provided with an improved, low cost EMI filter. In the preferred embodiment, the dynamoelectric machine takes the form of a brushless permanent magnet motor operatively connected to an inverter. A bridge rectifier provides rectified ac voltage to the inverter. The inverter operates to supply power to the motor in a predetermined way. A lossy choke is electrically connected in series between the bridge rectifier and the inverter. The lossy choke acts as a source resistance or real impedance to the input side of the bridge. By determining the real source impedance, the filter network is derived. The filter network then is electrically connected on the input side of the bridge rectifier. A method for designing an EMI filter for an inverter operated dynamoelectric machine is provided in which a lossy choke is used as source impedance for the filter design.

DESCRIPTION OF THE PREFERRED EMBODIMENT

Figure 1:
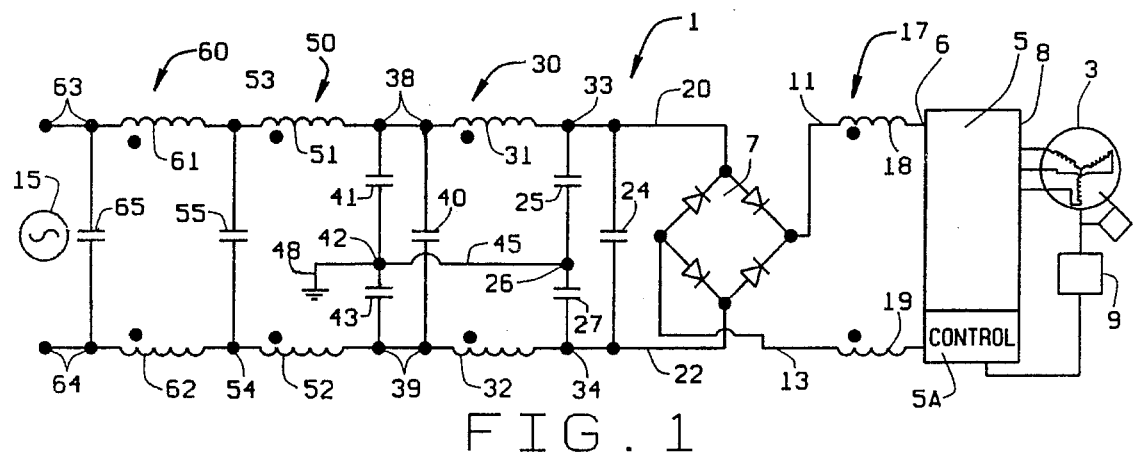
FIG. 1 is a block diagrammatic view of one illustrative embodiment of a six port EMI filter employed in conjunction with a dynamoelectric machine.
Figure 1A:
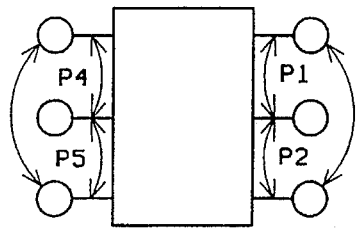
FIG. 1A is a diagrammatic view of the six ports shown in FIG. 1, corresponding reference numerals of the six port configuration being shown in FIGS. 1–3.

Referring now to FIG. 1, reference numeral 1 indicates one illustrative embodiment of EMI filter of the present invention. The filter 1 is employed, in the preferred embodiment, with respect to a motor 3 operatively connected to an inverter 5. The inverter 5 in turn is operatively connected to a power supply in the form of a full wave bridge rectifier 7.

As indicated above, motor 3 may comprise any of a variety of dynamoelectric machines. In the embodiment illustrated, the motor includes a stator assembly have an axial bore formed in it. A plurality of winding receiving slots open onto the bore. A stator winding of conventional design is placed in the slots. A rotor assembly is mounted for rotation with respect to the stator nd rotates within the bore. The rotor assembly may be a squirrel cage, a solid core, permanent magnet, or other construction type. In the embodiment illustrated, the rotor assembly is either a permanent magnet or switch reluctance, solid core rotor.

The inverter 5 includes a control section 5A, which provides logic control information to the inverter 5. A sensor 9 is associated with the motor 3 and provides rotor position information to the control section 5A of the inverter 5.

Sensor 9 is shown in the drawing as a discreet component. Those skilled in the art, however, recognize that there are a number of ways for determining rotor position. For example, the sensor 9 may comprise conventional hall effect sensors, commonly used to detect rotor position for switch reluctance and permanent magnet motors. In the alternative, the discreet sensor component 9 may be eliminated, rotor position information being obtained from electrical information available for control purposes based on motor operation. For example, a so called sensorless design described in copending application number 004411/08, and incorporated herein by reference, may be used in conjunction with my invention, if desired.

As also will be appreciated by those skilled in the art, the stator windings of the motor 3 may comprise a variety of designs. Commonly, a Y-connected or delta connected three-phase winding is employed with the motor 3. In that configuration, inverter 5 may be designed as a conventional six step or three phase H bridge design which is operatively connected between a first rail 11 and a second rail 13 on its input side 6 and to the motor 3 on an output side 8. The rails 11 and 13 are electrically connected to the output side of the rectifier 7.

In the embodiment shown, rectifier 7 is a full wave bridge rectifier of conventional design. Rectifier 7, in turn, is operatively connected to a source of alternating power, indicated generally by the reference numeral 15. In order to derive the proper values and components of the filter 1, a real source impedance 17 in the form of a very lossy balun wound choke is employed. The choke or impedance 17 has a first coil 18 placed in series in the first rail 11, while a second coil 19 is connected in series in the rail 13.

The rectifier 7 is operatively connected to the source 15 along an input line 20 and 22. A first capacitor 24 of the filter 1 is connected in parallel between the lines 20 and 22. A capacitor 25 has a first side connected to the line 20 and a second side connected to a connection node 26. A second capacitor 27 has a first side connected to the node 26 and a second side connected to the line 22. Balun wound inductor 30 has a first coil 31 connected in series with the line 20, and a second coil 32 connected in series with the line 22. One end of coil 31 is also connected to the capacitor 25 at a node 33 while the coil 32 has one side connected to the capacitor 27 at a node of 34. The inductor 31 has a second side connected to a node 38, while the second side of the coil 32 is connected to a node 39. A capacitor 40 is connected in parallel between the lines 20 and 22 at the nodes 38, 39. A capacitor 41 has a first side connected to the node 38 and a second side connected to a node 42. A capacitor 43 has a first side connected to node 42 and a second side connected to the node 39. Node 42 is connected to the node 26 by a conductor 45. The node 42 in turn is connected to ground as indicated at 48.

An inductor 50 includes a first coil 51 and a second coil 52. A first end of coil 51 is connected to the node 38, while a second end of coil 51 is connected to a node 53.

The coil 52 has a first end connected to node 39 and a second end connected to a node 54. A capacitor 55 is electrically connected between the nodes 53 and 54, across the lines 20 and 22. A very lossy balun wound core 60 has a first coil 61 and a second coil 62 commonly wound with one another. The first coil 61 is serially connected to the node 53 and to the source 15 at a node 63. The coil 62 is serially connected to the node 54 and the source 15 at a node 64. A capacitor 65 is connected in parallel across the lines 20 and 22 between the nodes 63 and 64. The lossy balun wound core 60 acts as load resistance (real load impedance).

The inverter 5 generates considerable noise with respect to earth ground. The paths for current flow from the motor to ground are such that the common mode currents generated by the inverter 5 return to ground through paths in the filter, preventing those currents from flowing into the power line. The capacitors 65, 55, 40, and 24, which essentially convert the six port network to a two port network, are present in the filter 1 to eliminate phase to phase EMI generated by inverter switching and unbalances in the capacitors 41, 43, and 25, 27. With the capacitors 65, 55, 40, and 24 installed, the six port filter network shown in FIG. 1 essentially becomes a two-port network, operating in common mode. That approximation allows the two-port network to be derived easily as one of many common filtered types. A 0.5 degree approximation to linear phase was chosen in commercial embodiments of the invention. Typically, the filter 1 need only maintain its characteristics to about ten times the cut off frequency at which the filter was intended to operate.

Figure 2:
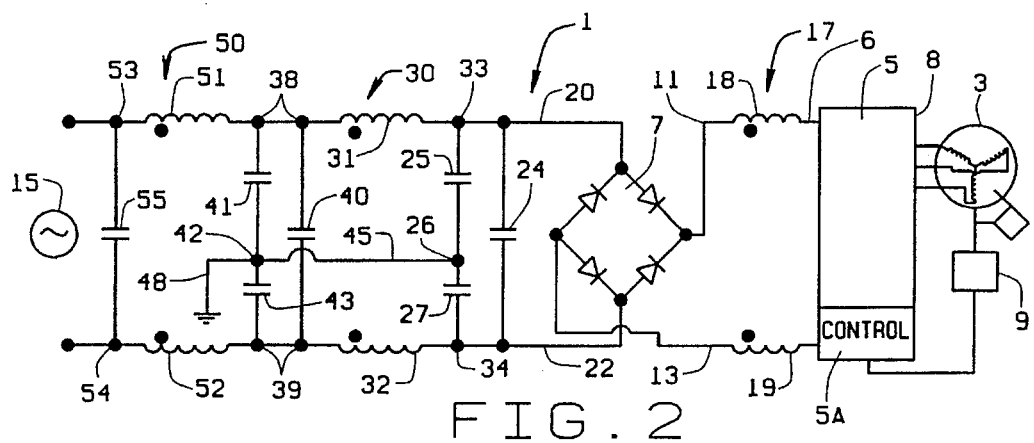
FIG. 2 is a diagrammatic view of a second illustrative embodiment of a six port design.

FIG. 2 demonstrates the reduced cost version of the filter shown in FIG. 1. Like referenced numerals are used to indicate like components. The embodiment of FIG. 2 is designed to take advantage of the real load impedance present in the standard test set up used to determine applicability of FCC standards. The standard FCC test set up has a line impedance stabilization network associated with it, which includes a series combination of a 50 ohm resistor and a 1 mF (micro farad, 1×10–6 farads) capacitor connected from each phase to ground. This enables the filter 1 to be designed and cost reduced because the real load impedance balun wound choke 60 and capacitor 65 of the embodiment shown in FIG. 1 can be eliminated. That elimination, as indicated, results in a less expensive filter design.

Figure 3:
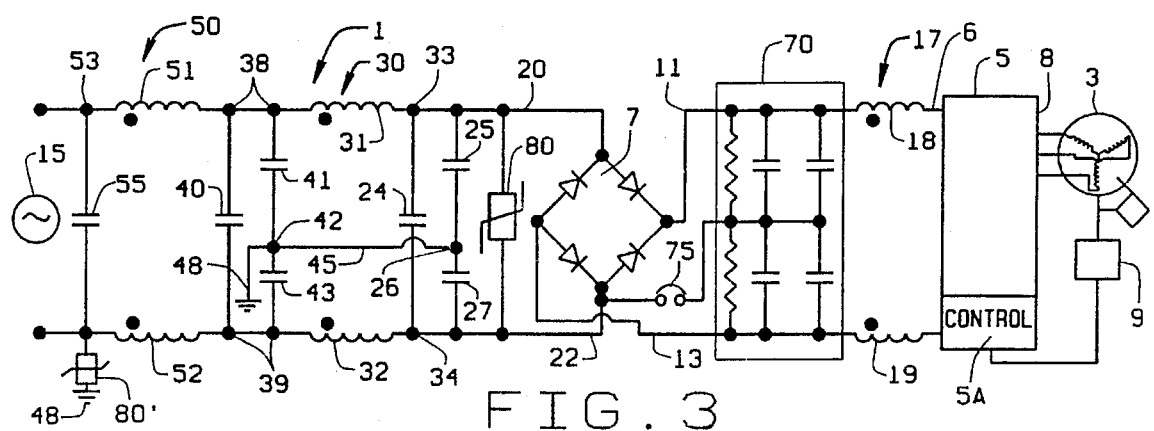
FIG. 3 is a diagrammatic view of the embodiment of FIG. 2 employed in a voltage doubling configuration for operation of a dynamoelectric machine.

Refer now to FIG. 3, the filter design of FIG. 2 is shown connected in a circuit embodiment in which the motor 3 can be operated either at 115 or at 230 volts. Jumper 75 is connected for 115 input (voltage doubling). Jumper 75 is not connected for 230 V operation (full bridge rectification). Two hundred thirty volt operation is obtained through the use of a voltage doubler circuit indicated generally by the referenced numeral 70. The particular voltage at which the motor 3 operates is determined by the action of a jumper 75.

The operation of the voltage doubler circuit 70 is conventional, and is not described in detail. The embodiment of FIG. 3 also has a metal oxide varistor (MOV) 80 inserted across the lines 20 and 22 at the input side of the rectifier 7. There is also a MOV 80' connected from one phase to GND as shown, which protects the unit from excessive common node voltage transients. MOV 80, 80' operation also is conventional, and protects the circuit components on the output side of the rectifier from being affected by fluctuations in the power line.

As thus described, the use of the lossy balun wound common mode inductor 17 enables a motor designer to employ filter design techniques heretofore unavailable in filters developed for dynamoelectric machines. The filter designed in accordance with my invention offers improved EMI containment at reduced cost.

Numerous variations, within the scope of dependant claims, will be apparent to those skilled in the art in light of the foregoing description and accompanying drawings. Merely by way of example, other rectifying devices or arrangements may be employed in other embodiments of the invention. While the inverter was described as a conventional six step—three phase H bridge inverter, other inverter designs may be used. Likewise, additional control mechanisms may be used to determine operating characteristics of the motor 1. These variations are merely illustrative.

Having thus described the invention, what is claimed and desired to be secured by letters Patent is:

1. In a control system for a dynamoelectric machine including a stator assembly having a plurality of windings, a rotor assembly mounted for rotation with respect to said stator assembly, an inverter operatively connected to said windings to supply the electrical energy to said windings in a predetermined manner, a bridge rectifier electrically connected to a source of power, said bridge rectifier having an input side and an output side, said rectifier defining on its output side first and second rails, said inverter being operatively connected between said first and second rails on its input side and to said dynamoelectric machine at its output side, the improvement comprising an electromagnetic interference filter for reducing electromagnetic interference associated with said control system and said dynamoelectric machine, said filter including a lossy core inductor having magnetically coupled first and second coils, one each of said first and second coils being serially connected in one each of said first and said second rails on the output side of said rectifiers; and a fourth order filter having 0.5 degree equiripple approximation to linear phase operatively connected on the input side of said bridge rectifier.

2. The improvement of claim 1 further includes a logic control operatively connected to said inverter.

3. The improvement of claim 2 further including rotor position sensing means operatively connected to said logic control.

4. The improvement of claim 3 wherein said rotor position sensing means comprises Hall effect sensors.

5. The improvement of the previous claim 4, further including a voltage doubler means operatively connected on the output side of said bridge rectifier.

6. The improvement of claim 3, wherein said rotor position sensing means is accomplished by monitoring an electrical characteristic of the dynamoelectric machine.

7. A control for an electrical device comprising;

a dynamoelectric machine including a stator assembly and a rotor assembly, said stator assembly including a core and a plurality of stator windings associated with said core, said rotor assembly including a rotor mounted for rotation with respect to said stator assembly;

a bridge rectifier having an input side and an output side, said bridge rectifier being operatively connected to an ac source on said input side, the output side of said rectifier defining first and second rails of dc potential;

an inverter having an input side and an output side, the input side of said inverter being connected in parallel between said first and said second rails of said bridge rectifier, the output side of said inverter being operatively connected to said stator windings for energizing said windings in a predetermined sequence; and a filter for reducing EMI transmissions during operation of said control, said filter including a lossy core inductor having magnetically coupled first and second coils, one each of said first and said second coils being operatively connected in series in respective ones of said first and said second rails on the output side of said bridge rectifier, and a linear phase filter designed with the lossy core inductor as a source impedance operatively connected on the input side of said bridge rectifier.

8. The control of claim 7 further includes a logic control operatively connected to said inverter.

9. The control of claim 8 further including rotor position sensing means operatively connected to said logic control.

10. The control of claim 9 wherein said rotor position sensing means comprises at least one Hall Effect sensor.

11. A method of designing an EMI filter for a control of an inverter operated dynamoelectric machine including a source of dc voltage, said voltage source having an input side and an output side, the output side defining first and second rails, and an inverter having a first side connected between said rails and a second side connected to said dynamoelectric machine comprising the steps of:

inserting a lossy core inductor having first and second coils on the output side of said source of voltage, between said source and said inverter;

determining the impedance of said lossy core inductor;

designing an EMI filter using the impedance so determined as the source impedance; and inserting said EMI filter on the input side of said source of dc voltage.

12. The method of claim 11, including the step of using an EMI test set up as a load impedance.

13. A method of claim 12, further including the step approximating the load impedances as much greater than the source impedance.

14. The method of claim 12, including the step of approximating the source impedance as much greater than the load impedance.

15. The method of claim 12 wherein the source of dc voltage is a full wave bridge rectifier.

* * * * *